United States Patent
Wilson et al.

(10) Patent No.: US 6,961,667 B1
(45) Date of Patent: Nov. 1, 2005

(54) ADAPTIVE TACHOMETER REDLINE

(75) Inventors: Mark A Wilson, Oxford, MI (US); Mark A Simonich, Highland, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 17 days.

(21) Appl. No.: 10/842,603

(22) Filed: May 10, 2004

(51) Int. Cl.$^7$ ............ G01N 37/00; G01P 3/00
(52) U.S. Cl. ............ 702/84; 702/145; 324/166
(58) Field of Search ............ 702/84, 142, 141, 702/145, 148, 147; 324/160, 166, 169, 402; 73/116, 118.1, 488, 660

(56) References Cited

U.S. PATENT DOCUMENTS

| | | |
|---|---|---|
| 4,356,445 A | 10/1982 | Congdon |
| 4,918,629 A | 4/1990 | Hackelman et al. |
| 4,939,659 A | 7/1990 | Moran et al. |
| 5,636,145 A | 6/1997 | Gorman et al. |
| 6,137,399 A * | 10/2000 | Westberg et al. ........ 340/441 |
| 6,215,298 B1 | 4/2001 | Westberg et al. |
| 6,441,726 B1 | 8/2002 | Voto et al. |
| 6,625,562 B2 | 9/2003 | Hayashi et al. |
| 6,633,811 B1 | 10/2003 | Aumayer |

* cited by examiner

Primary Examiner—John Barlow
Assistant Examiner—Meagan S Walling
(74) Attorney, Agent, or Firm—Ralph E. Smith

(57) ABSTRACT

A tachometer system is provided for a motor vehicle having an engine selected from a plurality of engines having unique maximum rated engine RPMs. The system has an RPM data signal and scale correction data. A microcontroller receives the RPM data signal and said scale correction data and generates a scaled tachometer signal therefrom in accordance with a computer program stored in a memory. A gauge drive circuit receives the scaled tachometer signal from the microcontroller. A tachometer gauge has a pointer driven by the gauge driver circuit. The computer program calculates the scaled tachometer signal according to a first scaling constant while the RPM data signal represents less than a predetermined RPM, and calculates the scaled tachometer signal according to a second scaling constant while the RPM data signal represents greater than the predetermined RPM. The second scaling constant is selected from a set of predetermined scaling constants according to the scale correction data.

16 Claims, 1 Drawing Sheet

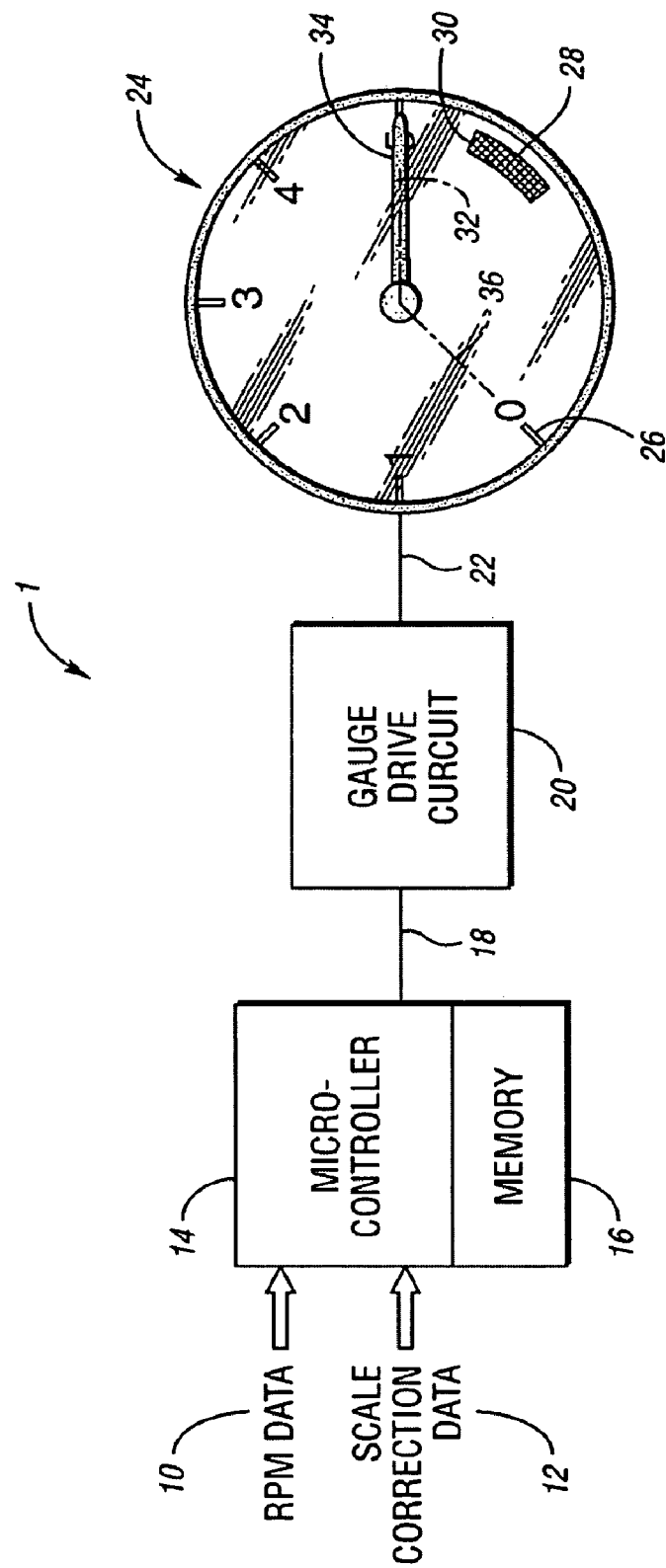

US 6,961,667 B1

ADAPTIVE TACHOMETER REDLINE

FIELD OF THE INVENTION

This invention relates generally to tachometers, and more particularly to tachometers which are capable of indicating more than one range of RPM.

BACKGROUND OF THE PRIOR ART

It is common for motor vehicles with internal combustion engines to have a tachometer for indicating the revolutions per minute, or RPM, of the engine crankshaft. It is also common for the dial face of the tachometer to include a red-colored strip that coincides with an RPM range that is at and above the maximum rated RPM for the engine. The lowest RPM represented by the red-colored strip is commonly called the engine redline.

It is also common for a particular model of motor vehicle to be offered with several different engines, with each engine having a different redline RPM. For example, a V8 engine may be offered in vehicle and have a 5500 RPM redline; while a V6 engine offered in the same vehicle may have a 6000 RPM redline. Since the engine redline must coincide with the redline region printed on the tachometer face, the vehicle manufacturer must design and assemble two different tachometers to coincide with the two engine redlines offered in the vehicle. In addition to the effort of designing the tachometers, the vehicle manufacturer is faced with the expense of maintaining inventories of different tachometers, and is also faced with the possibility of undesirably building a vehicle with a mismatched engine redline RPM/tachometer combination.

BRIEF DESCRIPTION OF THE INVENTION

In light of these issues identified with the prior art, a tachometer system is provided for a motor vehicle having an engine selected from a plurality of engines having unique maximum rated engine RPMs. The system has an RPM data signal and scale correction data. A microcontroller receives the RPM data signal and said scale correction data and generates a scaled tachometer signal therefrom in accordance with a computer program stored in a memory. A gauge drive circuit receives the scaled tachometer signal from the microcontroller. A tachometer gauge has a pointer driven by the gauge driver circuit. The computer program calculates the scaled tachometer signal according to a first scaling constant while the RPM data signal represents less than a predetermined RPM, and calculates the scaled tachometer signal according to a second scaling constant while the RPM data signal represents greater than the predetermined RPM. The second scaling constant is selected from a set of predetermined scaling constants according to the scale correction data.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWING

The FIGURE shows a block diagram of a tachometer system.

DETAILED DESCRIPTION OF THE INVENTION

The FIGURE shows a tachometer system 1 for a motor vehicle. A microcontroller 14 receives RPM data 10 and scale correction data 12. The data 10 and 12 may arrive as digital signals, network bus messages, serial data, or any other signal format compatible with microcontroller 14. The RPM data 10 is indicative of the actual engine RPM as is known in the art. The scale correction data 12 is indicative of the maximum rated RPM of the vehicle engine. For example, the scale correction data may indicate that the maximum rated RPM is 5500 when the system 1 is operating with a V8 engine; whereas the scale correction data may indicate that the maximum rated RPM is 6000 when the system 1 is operating with a V6 engine. The scale correction data may also be stored in a memory 16. Memory 16 is connected to microcontroller 14 and contains a computer program for converting the RPM data 10 to a scaled tachometer signal. The conversion applies one of a plurality of scaling constants to the RPM data 10 to derive the scaled tachometer signal. The steps needed to derive the scaling constants and selecting one of them is described later. The scaled tachometer signal is sent to a gauge drive circuit 20 via a connection 18.

The gauge drive circuit 20 is known in the art and operates to move a pointer 34 by a predetermined amount per each unit change in its input signal from connection 18. For example, if pointer 34 is capable of rotating a predetermined amount, say 270 degrees, clockwise from origin 36, then gauge drive circuit 20 moves the pointer from 0 to 270 degrees for a 0–100% change in the magnitude of its input signal arriving over connection 18.

An example tachometer gauge 24 face is imprinted with several radial graticules 26, where each graticule 26 corresponds to an engine RPM. In the pictured example, the graticule labeled with a "1" corresponds to 1000 RPM; the graticule labeled "2" corresponds to 2000 RPM, and so forth. A rotatable pointer 34 indicates the present RPM by pointing to the graticule, or a point between graticules, which corresponds to the present RPM.

The highest numbered graticule 32 is chosen to be less than the lowest maximum rated RPM of engines that are expected to be operated with the system 1. In the example stated above, the maximum rated RPMs are 5500 and 6000. Therefore, the example tachometer has a highest numbered graticule at 5000 RPM, which is less than the lowest maximum rated RPM of 5500.

The tachometer 24 also includes a redline 30 as the lowest RPM of a curved stripe 28. The stripe 28 is preferably colored red and conspicuous against the faceplate color. Redline 30 does not have an actual RPM value indicated on the faceplate.

In operation, the microcontroller 14 executes the computer program from its memory 16 to scale the RPM data 10. The computer program operates by providing a first scaling for RPM data 10 from zero RPM to a predetermined RPM 32, which is preferably the RPM of the highest numbered graticule. In the depicted example, this would be over the range of 0–5000 RPM. Over this range, the microcontroller applies a first scaling constant to the RPM data 10 to produce the scaled tachometer signal. In response to the scaled tachometer signal in this range of RPM data 10, the gauge drive circuit 20 correspondingly moves the pointer 34 between the graticules 26 representing zero to the predetermined RPM 32 (5000 RPM in this example.)

When the RPM data signal 10 indicates an RPM greater than the predetermined RPM 32 however, the microcontroller applies a second scaling constant to the RPM data 10 to produce the scaled tachometer signal. The scale correction data 12 is used to select the second scaling constant from a predetermined set of scaling constants. The number of scaling constants in the set corresponds to the number of unique maximum rated RPMs of the engines intended to be used with the system 1. In the example used above, the set would have two second scaling constants corresponding to the two unique maximum rated RPM values of 5500 and 6000.

The scaled tachometer signal derived with the second scaling constant is used by the gauge drive circuit 20 to move the pointer 34 in the region representing RPM values greater than the predetermined RPM 32 (>5000 RPM in this example.) The value of the second scaling constant is chosen such that the pointer 34 moves between the predetermined RPM 32 and the redline 30 to correspond with the RPM data 10 changing from the predetermined RPM and the maximum rated engine RPM as indicated by the scale correction data 12. Such a value for the second scaling constant assures that the pointer 34 will align with the redline 30 at the maximum rated engine RPM regardless of the actual value of the maximum rated engine RPM. This enables the same system 1 to be used in a vehicle regardless of the maximum rated engine RPM of the vehicle engine.

While the best mode for carrying out the invention has been described in detail, those familiar with the art to which this invention relates will recognize alternative designs and embodiment for practicing the invention. Thus, the above described preferred embodiment is intended to be illustrative of the invention that may be modified within the scope of the following appended claims.

What is claimed is:

1. A tachometer system for a motor vehicle having an engine selected from a plurality of engines having unique maximum rated engine RPMS, the system comprising:
   an RPM data signal and scale correction data;
   a microcontroller receiving said RPM data signal and said scale correction data and generating a scaled tachometer signal therefrom in accordance with a computer program stored in a memory;
   a gauge drive circuit receiving said scaled tachometer signal from said microcontroller; and
   a tachometer gauge having a pointer driven by said gauge driver circuit, wherein said computer program calculates said scaled tachometer signal according to a first scaling constant while said RPM data signal represents less than a predetermined RPM, and calculates said scaled tachometer signal according to a second scaling constant while said RPM data signal represents greater than said predetermined RPM, said second scaling constant being selected from a set of predetermined scaling constants according to said scale correction data.

2. The tachometer system of claim 1 wherein said RPM data comprises a network bus message.

3. The tachometer system of claim 1 wherein said RPM data comprises a digital pulse train.

4. The tachometer system of claim 1 wherein said predetermined RPM is less than the lowest maximum rated RPM of the plurality of engines.

5. The tachometer system of claim 1 wherein said tachometer gauge further comprises a dial face having numerated indicia with a highest numbered indicium representing an RPM less than or equal to said predetermined RPM.

6. The tachometer system of claim 1 wherein said scale correction data is a network bus message.

7. The tachometer system of claim 1 wherein said scale correction data resides in said memory.

8. A tachometer system for a motor vehicle having an engine selected from a plurality of engines having unique maximum rated engine RPMs, the system comprising:
   an RPM data signal and scale correction data;
   a microcontroller receiving said RPM data signal and said scale correction data and generating a scaled tachometer signal therefrom in accordance with a computer program stored in a memory;
   a gauge drive circuit receiving said scaled tachometer signal from said microcontroller; and
   a tachometer gauge having a dial face with a redline indicium, said tachometer gauge further comprising a pointer driven by said gauge driver circuit, said pointer being rotatable between a zero RPM position and said redline indicium, wherein said computer program calculates said scaled tachometer signal according to a first scaling constant while said RPM data signal represents less than a predetermined RPM, and calculates said scaled tachometer signal according to a second scaling constant while said RPM data signal represents greater than said predetermined RPM, said second scaling constant being selected from a set of predetermined scaling constants according to said scale correction data and the position of said pointer when pointing at said redline indicium.

9. The tachometer system of claim 8 wherein said RPM data comprises a network bus message.

10. The tachometer system of claim 8 wherein said RPM data comprises a digital pulse train.

11. The tachometer system of claim 8 wherein said predetermined RPM is less than the lowest maximum rated RPM of the plurality of engines.

12. The tachometer system of claim 8 wherein said dial face further comprises numerated indicia with a highest numbered indicium representing an RPM less than or equal to said predetermined RPM.

13. The tachometer system of claim 8 wherein said scale correction data is a network bus message.

14. The tachometer system of claim 8 wherein said scale correction data resides in said memory.

15. In a vehicle having an engine RPM data signal and a gauge drive circuit which receives a scaled tachometer signal derived from the RPM data signal, said scaled tachometer signal having a value associated with a redline indicium of a tachometer dial face, a method for deriving the scaled tachometer signal, the method comprising:
   determining a maximum rated RPM of an engine in the vehicle;
   deriving said scaled tachometer signal according to a first scaling constant while said RPM data signal represents less than a predetermined RPM; and
   deriving said scaled tachometer signal according to a second scaling constant while said RPM data signal represents greater than said predetermined RPM, wherein said second scaling constant is predetermined such that the scaled tachometer signal value associated with the redline indicium coincides with the RPM data signal at said maximum rated RPM.

16. The method of claim 15 wherein said step of determining a maximum rated RPM of an engine in the vehicle comprises receiving scale correction data.

* * * * *